US008993193B2

(12) United States Patent
Fuller et al.

(10) Patent No.: US 8,993,193 B2
(45) Date of Patent: Mar. 31, 2015

(54) SULFONATED PERFLUOROSULFONIC ACID POLYELECTROLYTE MEMBRANES

(75) Inventors: Timothy J. Fuller, Pittsford, NY (US); Beba T. Dobulis, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1894 days.

(21) Appl. No.: 11/198,060

(22) Filed: Aug. 5, 2005

(65) Prior Publication Data

US 2007/0031715 A1  Feb. 8, 2007

(51) Int. Cl.
 *H01M 8/10* (2006.01)
 *C08J 5/22* (2006.01)
 *H01M 8/04* (2006.01)

(52) U.S. Cl.
 CPC ............ *C08J 5/2243* (2013.01); *H01M 8/1023* (2013.01); *H01M 8/1039* (2013.01); *H01M 8/1067* (2013.01); *H01M 8/1072* (2013.01); *H01M 8/1081* (2013.01); *H01M 8/04164* (2013.01); *H01M 8/04291* (2013.01); *Y02E 60/521* (2013.01); *C08J 2381/06* (2013.01)
 USPC ............ 429/494; 429/479; 429/491; 429/493

(58) Field of Classification Search
 USPC ......................................... 429/314, 317, 494
 See application file for complete search history.

(56) References Cited

U.S. PATENT DOCUMENTS

| 5,795,496 A * | 8/1998 | Yen et al. ...................... 252/62.2 |
| 2002/0045085 A1* | 4/2002 | Formato et al. ................. 429/33 |
| 2004/0110051 A1* | 6/2004 | Srinivas .......................... 429/33 |
| 2005/0130006 A1* | 6/2005 | Hoshi et al. ..................... 429/30 |

OTHER PUBLICATIONS

Technical Information, "DuPont™ Nafion® PFSA Products Perfluorosulfonic acid polymer—Safe Handling and Use of Perfluorosulfonic Acid Products", DuPont, The miracles of science™, NAE301(Feb. 2004), pp. 1-4.
Product Information, "DuPont™ Nafion® PFSA Membranes NR-111 and NR-112, perfluorosulfonic acid polymer", DuPont, The miracles of science™, NAE201(2002), pp. 1-3.
Product Information, "DuPont™ Nafion® PFSA Membranes N-112, NE-1135, N-115, N-117, NE-1110 perfluorosulfonic acid polymer", DuPont, The miracles of science™, NAE101(Nov. 2002), pp. 1-4.
Nafion® Ion-Exchange Membranes, Product and Reference Guide (order form), ALDRICH, Unknown date, p. 1.

* cited by examiner

*Primary Examiner* — Ula C Ruddock
*Assistant Examiner* — Archer Dudley
(74) *Attorney, Agent, or Firm* — Quinn Law Group, PLLC

(57) ABSTRACT

New proton conducting membranes are made of perfluorosulfonic acid polymers films that have been treated by exposing them to a chlorosulfonating agent. The membranes are used as a proton exchange membrane in PEM fuel cells operating at temperatures above 95° C., or at low relative humidity. In various embodiments, the treated films have superior physical properties such as tensile strength, when compared to an untreated film. In some embodiments, the ion exchange capacity (IEC) of the treated films is increased.

15 Claims, 1 Drawing Sheet

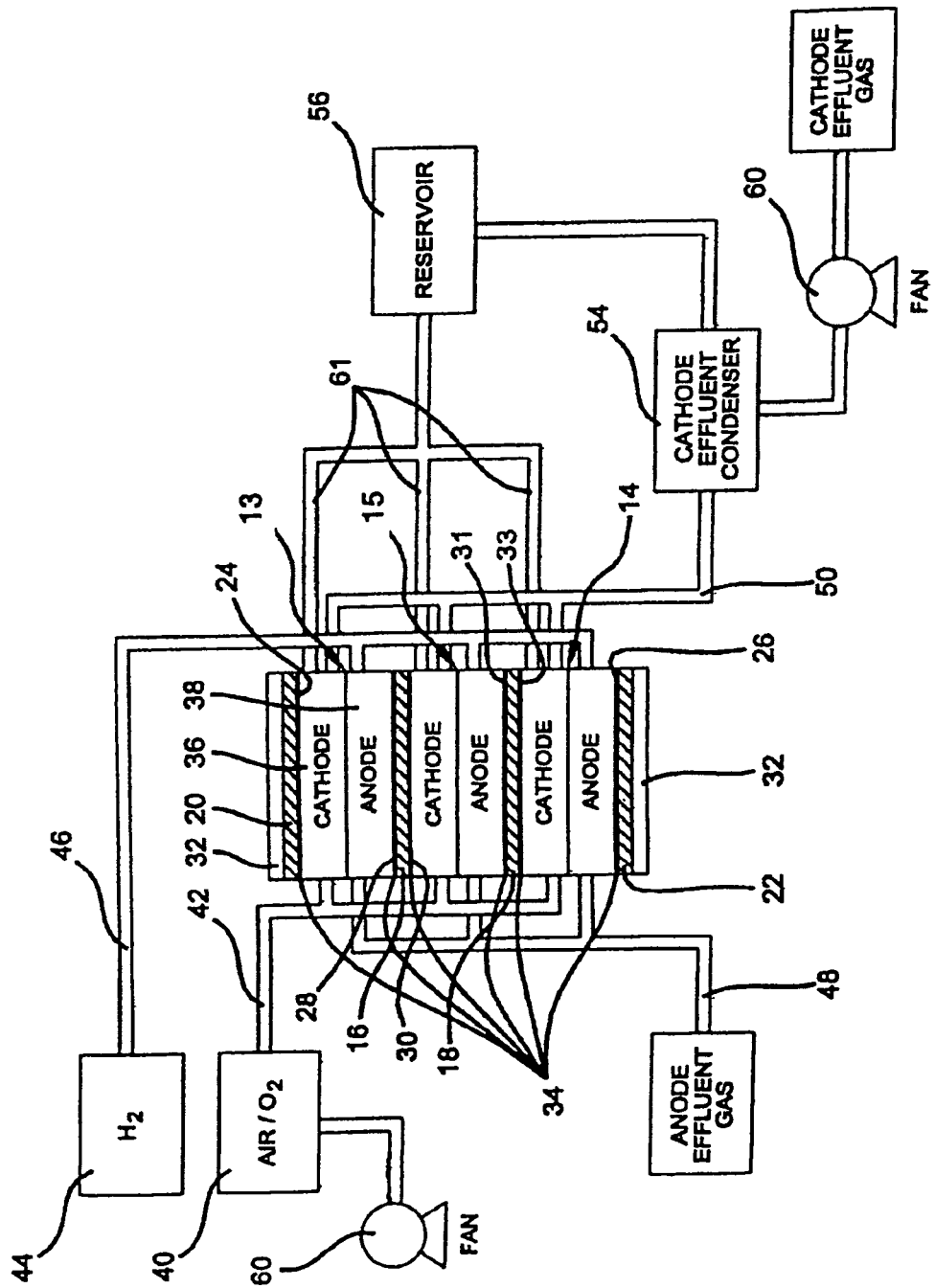

SULFONATED PERFLUOROSULFONIC ACID POLYELECTROLYTE MEMBRANES

The present invention relates to polyelectrolyte membranes and their use as proton exchange membranes in fuel cells. More particularly, the invention relates to treatment of perfluorosulfonic acid films to provide a polyelectrolyte membrane for fuel cell applications.

Fuel cells are increasingly being used as power sources for electric vehicles and other applications. An exemplary fuel cell has a membrane electrode assembly with catalytic electrodes and a membrane formed between the electrodes. Hydrogen fuel is supplied to the anode side of the assembly, while oxygen is supplied to the cathode. The membrane provides an ionic connection between the anode and cathode, and provides a medium through which fuel oxidation products are transported from the anode to combine with the reduced oxygen at the cathode. The overall reaction in the fuel cell is the combination of hydrogen and oxygen to yield water and an electromotive potential. Because the oxidation product of the fuel is essentially $H^+$ or a proton, the polyelectrolyte membrane is also known as a proton conducting membrane or a proton exchange membrane (PEM).

Water management is important in a PEM fuel cell. A proton must be hydrated to pass through the proton exchange membrane to combine with oxygen at the cathode. According to various models, 7 to 11 water molecules are needed to account for the transport of one proton (with a solvation sphere of 3 to 4 water molecules) through the membrane. It has been observed that when relative humidity in the fuel cell is low, proton transport is less efficient and the current available from the cell is reduced. To avoid this, it is possible to humidify fuel cells to prevent the membranes from drying out. However, as temperature of fuel cell operation increases, pressurization may be necessary which leads to added expense.

PEM fuel cells operate at temperatures up to about 95° C. with external humidification at elevated pressures being required to maintain proton conductivity. As the membranes dry out at reduced humidity, proton conductivity deteriorates rapidly.

The industry is constantly looking for new membrane materials that conduct protons efficiently at reduced humidity levels and over a wide range of temperature and humidity conditions. It would further be desirable to provide membranes for PEM fuel cells with improved cost and durability characteristics.

SUMMARY

New proton conducting membranes are made of perfluorosulfonic acid polymers films that have been treated by exposing them to a halosulfonating agent such as a chlorosulfonating agent. The membranes are used to transport protons in proton exchange membrane or polyelectrolyte membrane (PEM) fuel cells operating at temperatures near 95° C., or at low relative humidity. In various embodiments, the treated films have superior physical properties such as improved tensile strength, when compared to an untreated film. In some embodiments, the ion exchange capacity (IEC) of the treated films is increased.

Treating the films leads to better handleability of the films, reflected in increased tensile strength and other physical properties. Films with increased tensile strength can be more readily manipulated to manufacture fuel cells of the invention. This is especially advantageous for films of PSFA polymers with an equivalent weight of about 1000 or less. Films are obtained having an advantageous combination of physical properties and proton conducting capacity.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a schematic illustration of three cells in a stack in an exemplary fuel cell system.

DETAILED DESCRIPTION OF THE PREFERRED EMBODIMENTS

The following description of the preferred embodiment(s) is merely exemplary in nature and is in no way intended to limit the invention, its application, or uses.

In one embodiment, the invention provides a solid polymer electrolyte made by a process comprising reacting a perfluorosulfonic acid (PFSA) polymer film with a halosulfonating agent. Reaction of the perfluorosulfonic acid polymer film with halosulfonating agent is followed by exposure to water to hydrolyze the halosulfonic acid groups. In various embodiments, the treatment further crosslinks some of the incorporated sulfonic acid or halosulfonic acid groups. Thus in one embodiment, the solid polymer electrolyte so treated contains a plurality of crosslinks of structure

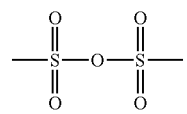

In various embodiments, the solid polymer electrolyte has an equivalent weight of 700 to 1200. Non-limiting examples include the equivalent weights of 900 to 1000.

In a preferred embodiment, the halosulfonating agent comprises chlorosulfonic acid. Treatment of perfluorosulfonic acid polymer films with halosulfonating agents such as chlorosulfonic acid results in films of improved handleability and structural integrity without loss of proton transporting capacity.

In another embodiment, the invention provides a method for manufacturing a treated perfluorosulfonic acid polymer film suitable for use as a polyelectrolyte membrane in electrochemical devices such as fuel cells. The method comprises first casting a film of a perfluorosulfonic acid polymer that has an equivalent weight of about 700 to about 1200 onto a hard substrate. The cast film is then floated off the substrate into a liquid such as water. After removal from the floating liquid, the film is then exposed to a halosulfonating agent such as chlorosulfonic acid, for example in aqueous solution. After exposure to the halosulfonating agent (in a preferred embodiment, a chlorosulfonating agent), the film is exposed to water to hydrolyze incorporated $SO_2Cl$ groups. Following hydrolysis, the film is dried. In a preferred embodiment, the cast film has an equivalent weight of from 700 to 1000. Such polymers, when cast into films normally have poor handleability characteristics due to a high water content that is ascribable to the low equivalent weight and the resulting hydrophilic nature of the polymer film containing a high concentration of sulfonic acid groups per unit volume. Normally, the hydrophilic nature of such films makes them difficult to handle in order to construct polyelectrolyte membranes, membrane electrode assemblies, or fuel cells from them. Advantageously, the manufacturing method described above increases the physical properties of low equivalent weight perfluorosulfonic acid films such that they can be readily handled and incorporated into membrane electrode assemblies suitable for use in electrochemical devices such as fuel cells.

In various embodiments, the step of exposing the film to a halosulfonating agent such as chlorosulfonic acid reduces the amount of time that the cast film needs to be dried in order to create a handleable film. In various embodiments, the exposure to a chlorosulfonating agent takes place at ambient conditions such as about 25-40° C. for times up to about 4 hours. This compares favorably with the longer drying times and higher temperatures required to produce useable films without carrying out the treatment steps of the current invention.

In another embodiment, the invention provides a method for preparing a polyelectrolyte membrane. The method comprises immersing a PFSA film in a solution containing a halosulfonating reagent for a time and at a temperature sufficient to form a halosulfonated film. Then the halosulfonated film is exposed to water to form an insoluble sulfonated PFSA film. In a preferred embodiment, the halosulfonating agent comprises chlorosulfonic acid. In preferred embodiments, the PFSA film is sulfonated to achieve an ionic exchange capacity (IEC) of at least about 1.0 meq/g. In various embodiments, films are sulfonated to such an extent that the IEC is increased by 5% or more and preferably by 10% or more. In a non-limiting embodiment, the IEC is increased by about 16% upon treatment.

The invention also provides a membrane electrode assembly comprising a catalytic anode, a catalytic cathode, and a proton exchange membrane disposed between and in contact with the electrodes. The proton exchange membrane is a polyelectrolyte film treated as discussed above. The invention further provides fuel cells containing these membrane electrode assemblies.

Fuel cells of the invention contain an anode, a cathode, and a polyelectrolyte membrane disposed between the anode and the cathode. The fuel cells further comprise inlets for hydrogen fuel gas adjacent the anode and inlets for oxygen gas adjacent the cathode. The polyelectrolyte membrane is a treated PFSA film as described above and in more detail below.

The proton exchange polyelectrolyte membranes of the invention are based on treated films of PFSA polymers. Suitable PFSA polymers include those represented by formula (I)

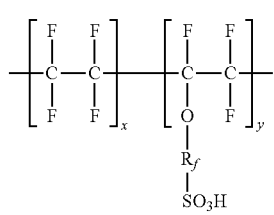

(1)

where $R_f$ represents a perfluoroalkylene or perfluorooxyalkylene group, and x and y the relative proportion of perfluoromonomer and sulfonated monomer respectively, in the polymer. The equivalent weight of the polymer is determined in part by the relative ratio of x and y, and in part by the relative size of the connecting group $R_f$. Two commercial embodiments are given by the formulas (2) and (3)

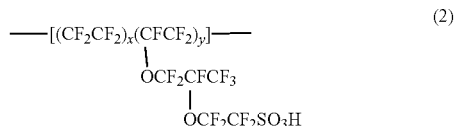

(2)

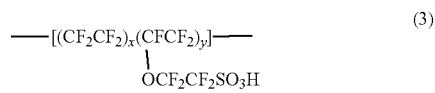

(3)

Formula (2) represents a "long chain" perfluorosulfonic acid polymer; it is a copolymer of tetrafluoroethylene (TFE) and a monomer with structure

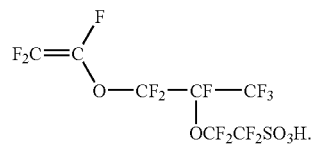

Formula (3) represents a "short chain" polymer; it is a copolymer of TFE and

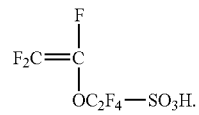

In general, higher equivalent weights may be attained by using the short chain polymers. In one aspect, treating PFSA films increases the IEC of films. In various embodiments, the handleability of the films is improved, with or without simultaneously increasing the IEC. Improved handleability means the films can be handled readily without tearing; it is reflected in tensile strength and other physical property measurements.

In various embodiments, membranes of the invention are made by treating a PFSA film with a halosulfonating agent, preferably with a chlorosulfonating agent. In various embodiments, PFSA film reacts with chlorosulfonic acid or other suitable chlorosulfonating agent to introduce a chlorosulfonyl group (—$SO_2Cl$) onto the polymer. The polymer-bound chlorosulfonyl groups are subsequently converted to sulfonic acid groups upon hydrolysis, for example by exposing the sulfonated films to boiling water for one hour. The products derived from reaction with the chlorosulfonic acid or other halosulfonating agent are insoluble. This is believed to be due in part to a crosslinking reaction involving the formation of sulfonic acid anhydride groups (—$SO_2$— or —$SO_2$—O—$SO_2$—), described further below. The crosslinking provides advantages, as it reinforces physical properties and prevents the films from dissolving in water. Thus in one embodiment, PFSA films are provided that have a relatively higher acid content (or higher IEC), without diminution of strength characteristics.

Without being bound by theory, treating the PFSA films as described herein introduces —$SO_2Cl$ (in the case of a chlorosulfonating agent) groups that are subsequently converted to —SO$_3$H or corresponding salts. It is believed that at least some of the —SO$_3$H are crosslinked during the treatment to produce sulfonyl anhydride crosslinks of structure

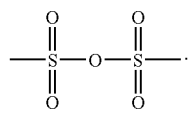

To the extent that —SO$_3$H groups are added, the measured IEC of the treated films increases. However, crosslinking removes —SO$_3$H groups such that the measured IEC would be lower than predicted based on the initial incorporation of —SO$_3$Cl groups. Depending on the relative level of sulfonation and crosslinking, the treated films will display a range of IEC. In various embodiments, physical properties of the films will be improved even though no increase in IEC is measured. In other embodiments, improved handleability of the films (due to crosslinking in a non-limiting model of the invention) is accompanied by an increase in IEC.

In various embodiments, treated films show enhanced values of such physical properties as tensile strength, strain at break, yield stress, modulus, yield strain, or any combination of them, in comparison to untreated films. The resulting increase in the ease of handling of the treated films is especially advantageous in the case of films made of polymers of relative low equivalent weight. To illustrate, commercial PFSA polymers and films made from them are available with equivalent weights from about 700 to 1100. Films with lower equivalent weights are advantageous because, having more —SO$_3$H groups per unit volume and unit weight, they generally have a higher capacity for proton transport, which is due to the hydrophilic nature of the highly sulfonated environment. But high capacity films tend to be difficult to handle because they contain a lot of water, which tends to make them flimsy. Treatment of the films according to the invention increases handleability without sacrificing proton transport capacity.

In various embodiments, a PFSA film is treated by reacting the film with ClSO$_3$H or other suitable halosulfonating agent. In a non-limiting example, preformed films of PFSA (prepared for example by casting, extrusion, or bar drawing) are immersed in a solution of chlorosulfonic acid in a solvent such as dichloromethane or 1,2-dichloroethane. Immersion occurs for a time and at a temperature sufficient to incorporate a desired amount of sulfonate or chlorosulfonyl groups onto the active sites of the polymer. After immersing the film in the chlorosulfonic solution for a sufficient time, the film is exposed to water. This step converts the chlorosulfonyl groups to sulfonic acid groups by hydrolysis. The hydrolysis step may be carried out at elevated temperatures, such as in boiling water, to provide faster reaction kinetics.

After treatment, the amount of sulfonic acid groups incorporated into the film can be determined by conventional means, such as titration with sodium hydroxide to a pH of 7. The number of milliequivalents (meq) of sodium hydroxide solution required to titrate the film to a pH of 7 is converted into meq SO$_3$H/g of film by conventional methods. The value of meq SO$_3$H/g determined by titration techniques is also referred to as the ion exchange capacity (IEC) of the film. In various embodiments, the treatment method of the invention provides a way to increase the IEC of PFSA films.

Perfluorosulfonic acid polymers and films made from them are commercially available. Films can be cast from dispersions or solutions of PFSA. Exemplary suitable dispersions contain from about 5 to about 20% by weight of the perfluorosulfonic acid polymer. Higher concentrations may be used as well. In various commercial embodiments, the products are provided as dispersions in water or in water plus up to about 50% of a volatile organic component such as 1-propanol. Suitable commercial polymer dispersions are sold by DuPont under the Nafion® tradename and by Asahi Kasei Corporation under the Aciplex® tradename.

In various embodiments, polyelectrolyte membranes made of treated films of the invention have liquid water conductivity measured in S/cm at 30° C. or 100° C. that is comparable to and generally superior to that of conventional untreated PFSA films used as proton exchange membranes in fuel cells. For example, the commercially available proton exchange membrane Nafion® 112 from DuPont exhibits a liquid conductivity of 0.078 S/cm at 30° C. and 0.157 S/cm at 100° C. Such conductivity measurements may be made as described by Zawodzinski et al., J. Phys. Chem. 95 (15) 6040 (1991). The membrane is conditioned in 100° C. water for 1 hour and the measurement cell is submerged in 25° C. deionized water during the experiment. The membrane impedance (real) is taken at zero imaginary impedance. Treatment of PFSA films such as Nafion® 112 as described herein increases the wet conductivity. Along with wet conductivity, water uptake is also increased, without loss of film mechanical properties.

In addition to the improved physical characteristics of treated films discussed above, the manufacturing method of the invention provides other advantages. As background, it is appreciated that polyelectrolyte membranes made from the PFSA films described herein operate by transporting protons from the anode side of the fuel cell to the cathode side. Normally proton transport is accompanied by the transport of a hydration sphere associated with the protons. For this reason, the anode side of the membrane tends to dry out. On the other hand, water is produced on the cathode side of the membrane and is available to back diffuse through the proton exchange membrane to keep the anode side from drying out. For best efficiency, the proton exchange membrane is preferably as thin as possible to allow the back diffusion of water. Commercial membranes are on the order of 1 mil (0.001 inches, 0.0025 cm) in thickness or less, and can range up- to 2 mils or even up to 7 mils in thickness. Because the films are so thin, normally one needs to go to about an equivalent weight of 1100 to get good handleability. For example, membranes made of polymers having an equivalent weight of 1000 or less are normally hard to handle, especially when thin to allow for back diffusion of water during operation of the fuel cell.

To partially overcome the handleability problem of conventional films made of polymers having an equivalent weight of 1000 or less, a heat annealing step is generally needed to improve their handleability. For example, it is often desirable to heat anneal the membrane overnight at a temperature of about 120° C. With the method of the invention involving halosulfonation or preferably chlorosulfonation of PFSA films, instead of 12 hours at 120° C. to cure and anneal the 1000 equivalent weight membrane, the films can be treated by exposing them to a chlorosulfonating agent for a period of about 1 to 4 hours, followed by optional drying in an oven. Alternatively, it is possible to air dry the chlorosulfonated film at ambient temperatures. The time for chlorosulfonating and drying the films of the invention can be considerably less than the time required for heat annealing conventional (untreated) films.

Another advantage of polyelectrolyte membranes made from treated films according to the invention is that the break-in time during operation of fuel cells containing the membranes is reduced. Break-in refers to a series of steps normally needed at the beginning of fuel cell operation for the proton exchange membrane to come into an equilibrium situation and attain consistent operation. Normally the break-in period involves humidification steps and oscillation between voltages for a number of iterations. Generally, the break-in time is lower for membranes that contain a high amount of sulfonic acid groups (i.e., a relatively low equivalent weight).

According to another embodiment of the invention, a fuel cell is provided that contains the treated PFSA film as a proton exchange membrane. Such fuel cells typically contain a membrane electrode assembly (MEA) containing a catalytic anode, a catalytic cathode, and a proton exchange membrane disposed between the anode and cathode, where the proton exchange membrane is the sulfonated PFSA film described above. The MEAs are constructed according to known methods—such as for example disclosed in Sompalli et al., U.S. Pat. No. 6,524,736—from the membranes of the invention and the respective electrodes. The fuel cell also contains an inlet adjacent the anode for providing hydrogen fuel to the anode side of the fuel cell, and an inlet adjacent, the cathode for providing oxidant gas (oxygen or air) to the cathode.

Referring generally to FIG. 1, three individual proton exchange membrane (PEM) fuel cells according to one preferred embodiment of the present invention are connected to form a stack. Each PEM fuel cell has membrane-electrode-assemblies (MEA) 13,15,14, respectively, separated from one another by electrically conductive, impermeable separator plates 16,18, and further sandwiched between terminal separator plates 20,22 at each end of the stack with each terminal plate 20,22 having only one electrically active side 24,26. An individual fuel cell, which is not connected in series within a stack, has a separator plate, with only a single electrically active side. In a multiple fuel cell stack, such as the one shown, a preferred bipolar separator plate 16 typically has two electrically active sides 28,30 respectively facing a separate MEA 13,15 with opposite charges that are separated, hence the so-called "bipolar" plate. As described herein, the fuel cell stack has conductive bipolar separator plates in a stack with multiple fuel cells, however the present invention is equally applicable to conductive separator plates within a stack having only a single fuel cell.

The MEAs 13,15,14 and bipolar plates 16,18 are stacked together between aluminum clamping plates 32 at each end of the stack and the end contact terminal plate elements 20,22. The end contact terminal plate elements 20,22, as well as working faces 28,30 and 31,33 of both bipolar separator plates 16,18, contain a plurality of gas flow channels (not shown) for distributing fuel and oxidant gases (i.e., $H_2$ & $O_2$) to the MEAs 13,15,14. Nonconductive gaskets or seals (not shown) provide seals and electrical insulation between the several components of the fuel cell stack. Gas-permeable conductive diffusion media 34 press up against the electrode faces of the MEAs 13,15,14. When the fuel cell stack is assembled, the conductive gas diffusion layers 34 assist in even distribution of gas across the electrodes of the MEAs 13,15,14 and also assist in conducting electrical current throughout the stack.

An inlet for oxygen adjacent the cathode and an inlet for hydrogen adjacent the anode are also provided. Oxygen is supplied to the cathode side 36 of each fuel cell in the stack from storage tank 40 via appropriate supply plumbing 42 to provide an inlet for oxygen (or air) adjacent the cathode, while hydrogen is supplied to the anode side 38 of the fuel cell from storage tank 44, via appropriate supply plumbing 46 to provide an inlet for hydrogen adjacent the anode. Alternatively, air may be supplied to the cathode side 36 from the ambient, and hydrogen to the anode 38 from a methanol or gasoline reformer, or the like. Exhaust plumbing for the anode side 48 and the cathode side 50 of the MEAs 13,15,14 are provided. On the cathode side, the plumbing defines an exit side. Gas flow into and out of the stack is typically facilitated by fans 60, such as those shown in the exemplary configuration of FIG. 1. Any means of transporting fluids into and out of the stack are feasible, and the configuration and number of fans shown is merely exemplary and not limiting.

As shown in FIG. 1, the cathode effluent 50 is routed from the stack to a condenser 54, which serves to liquefy and recover the vapors in the cathode effluent stream 50. The liquids (e.g. water) are transported to a reservoir 56 for storage. The effluent stream 50 from the cathode has a high concentration of vapor (water vapor, for example) due to the water generated by the electrochemical reactions occurring within the MEA and any additional water introduced for cooling. The water evaporates due to pressure and temperature conditions within the fuel cell. Preferably, the effluent stream is saturated with vapor (e.g. in the case of water at approximately 100% relative humidity). As shown, the supply conduits 61 provide water to the cathode side of each MEA 13,15,14 by interconnecting the reservoir 56 to the fuel cells in the stack. A pump (not shown) may optionally be included in the system to facilitate the transport of the liquid from the reservoir 56 to the stack, or through other areas of the system.

The invention has been described above with respect to various preferred embodiments. Further non-limiting examples are given in the examples that follow.

EXAMPLES

Example 1

Sulfonation of PFSA Films with Chlorosulfonic Acid at 25° C.

Dichloromethane (50 mL, 66 g) and chlorosulfonic acid (between 0.7 and 1.4 g) are added sequentially to a wide mouth glass bottle (120 mL capacity, 2 inch diameter). 10 mL of this solution are added to dichloromethane (50 mL, 66 g) in a wide mouth glass jar (410 mL, 3 inch diameter). To this mixture is added a 1 mil thick (0.001 inch, 0.0025 cm) colorless film of PFSA (for Example, Nafion® N-1000) consisting of a circle with a diameter of 2.75 inches and weighing between 0.14 and 0.18 gm. The jar is sealed with a screw cap lid and the film is allowed to react for various amounts of time at 25° C. or at 40° C. while being suspended in the reaction solution. The insoluble colorless film is observed to turn brown after several minutes of immersion in the reaction solution. After a variable time of reaction, the brown film is then added to distilled water (200 mL) and the film turns light pink. The film is washed extensively with more water (about 2 liter) and then boiled in water (250 mL) for about 1 hour. A weighed portion of the film is then suspended in 1 molar sodium chloride (220 mL) and the amount of sulfonation is determined by titration with 0.01 molar sodium hydroxide to a pH 7 end point. The amount of sulfonation (in meq/g $SO_3H$) is determined to be 1.16 compared to 1.0 in the starting film. The sulfonated-film with 1.16 meq/g $SO_3H$ has a proton conductivity of 0.106 and 0.314 S/cm at 30° C. and 100° C. respectively (average of three determinations). The starting film has conductivity of 0.026 S/cm at 30° C. and 0.088 S/cm at 100° C. Water uptake of the treated film is 27% for 1 hour at 30° C. (compared to 12% for the starting film) and 57% for 1 hour at 100° C. (compared to 33% for the starting film).

Example 2

Conductivity against relative humidity at temperatures from 30° C. to 120° C. are comparable for the untreated and treated films of Example 1.

Example 3

The untreated and treated films of Example 1 exhibit similar 50 cm² single cell fuel cell performance at 80° C.

Example 4

The treated and untreated films of Example 1 are compared with respect to several physical properties in the following table.

| | Tensile stress (MPa) | Strain at Break (%) | Yield stress (MPa) | Modulus | Yield Strain |
|---|---|---|---|---|---|
| Ex. 1 Treated | 24 | 132 | 15.4 | 334 | 6.8 |
| Untreated | 20.6 | 122 | 14.7 | 326 | 6.5 |

Although the invention has been described above with respect to various preferred embodiments, it is to be understood that the scope of the invention is not limited to the embodiments disclosed. Variations and modifications as will occur to those of skill in the art upon reading the disclosure are also included in the scope of the invention, which is defined only by the appended claims.

What is claimed is:

1. A fuel cell comprising,
an anode;
a cathode;
a proton exchange membrane disposed between the anode and the cathode;
an inlet for hydrogen adjacent the anode; and
an inlet for oxygen adjacent the cathode,
wherein the proton exchange membrane comprises a treated PFSA film made by exposing an untreated PFSA film to a halosulfonating agent to cause crosslinking reaction in the membrane by formation of sulfonic acid anhydride groups so that the proton exchange membrane comprises sulfonic acid anhydride cross-links of structure

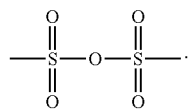

2. A fuel cell according to claim 1, wherein the proton exchange membrane comprises a polymer having an equivalent weight of 800 to 1200.
3. A fuel cell according to claim 2, wherein the equivalent weight is 900 to 1000.
4. A fuel cell according to claim 1, wherein the perfluorosulfonic acid comprises a copolymer of tetrafluoroethylene and

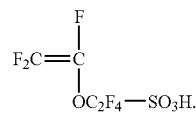

5. A fuel cell according to claim 1, wherein the halosulfonating agent comprises chlorosulfonic acid.
6. A fuel cell according to claim 1, wherein the treated PFSA film is characterized by an ion exchange capacity at least 10% higher than that of the untreated PFSA film.
7. A fuel cell according to claim 1, wherein the proton exchange membrane is made by reacting a preformed PFSA film with chlorosulfonic acid, exposing the reaction product to water, and drying.
8. A fuel cell according to claim 7, wherein the preformed PFSA film has an equivalent weight of 700-1000.
9. A fuel cell according to claim 7, wherein the preformed PFSA film has an equivalent weight of 800-1200.
10. A fuel cell according to claim 7, wherein the preformed PFSA film comprises a copolymer of tetrafluoroethylene and

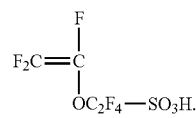

11. A fuel cell comprising,
an anode;
a cathode;
a proton exchange membrane disposed between the anode and the cathode;
an inlet for hydrogen adjacent the anode; and
an inlet for oxygen adjacent the cathode,
wherein the proton exchange membrane comprises a PFSA film with sulfonic acid anhydride cross-links of structure

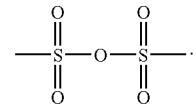

12. A fuel cell according to claim 11, wherein the proton exchange membrane comprises a polymer having an equivalent weight of 800-1200.
13. A fuel cell according to claim 11, wherein the proton exchange membrane comprises a polymer having an equivalent weight of 700-1000.
14. A fuel cell according to claim 11, wherein the proton exchange membrane comprises a copolymer of tetrafluoroethylene and

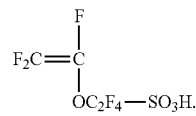

15. A fuel cell according to claim 1, wherein the proton exchange membrane's polymer film consists essentially of the treated PFSA film.

* * * * *